Jan. 7, 1964 C. V. STEVENSON 3,116,811
PORTABLE CABLE CLEANER AND LUBRICATOR
Filed April 27, 1961 2 Sheets-Sheet 2
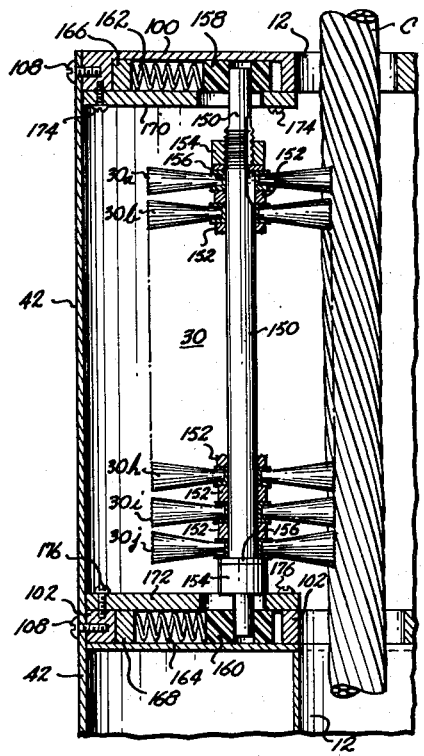
Fig. 4.
Fig. 5.
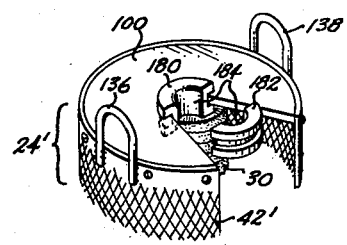
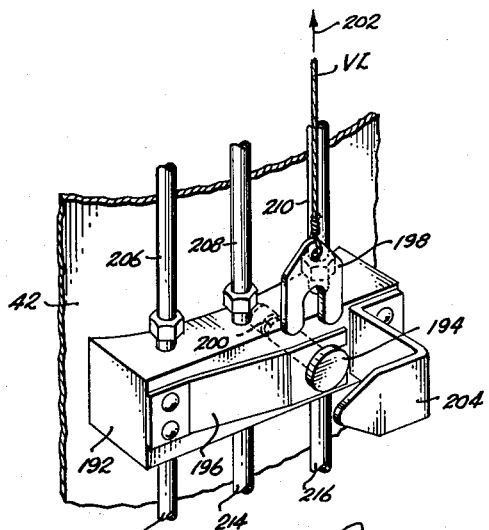
Fig. 6.
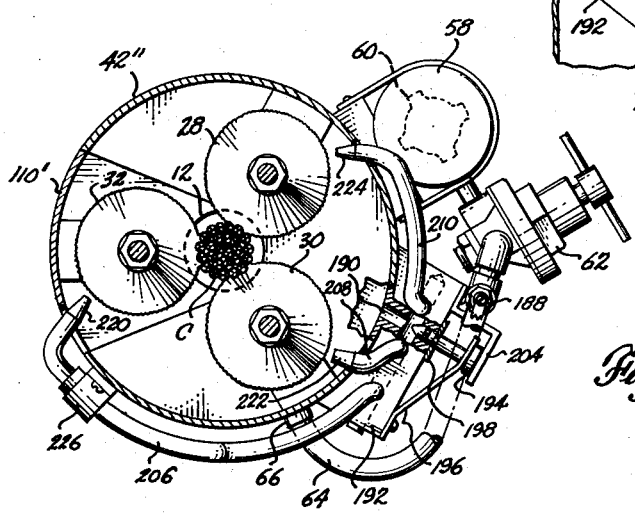
Fig. 7.
INVENTOR.
CLAIR V. STEVENSON
BY
Mathis and Graybeal
ATTORNEYS

United States Patent Office 3,116,811
Patented Jan. 7, 1964

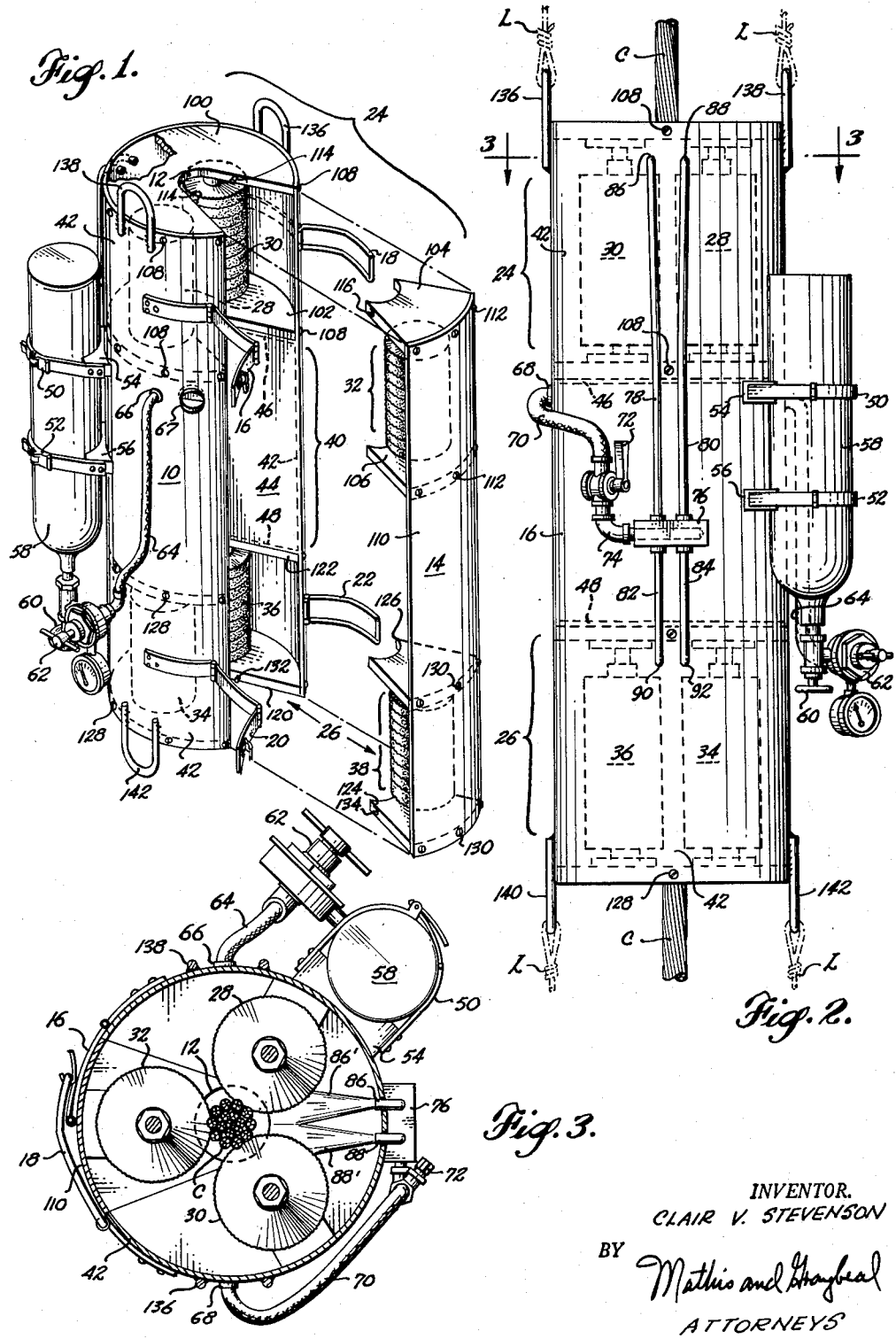

3,116,811
PORTABLE CABLE CLEANER AND LUBRICATOR
Clair V. Stevenson, 1610 43rd Ave. N., Seattle, Wash.
Filed Apr. 27, 1961, Ser. No. 106,094
20 Claims. (Cl. 184—17)

The present invention relates to reconditioning devices for cable and the like, and more particularly relates to such devices adapted for simply and efficiently cleaning and/or lubricating multi-strand cable of the type wherein the device is portable and assemblable on an removable from the cable at any desired point without threading the end of the cable through the device.

In many usages, multi-strand cable, also termed wire rope, becomes quite fouled by dirt, old grease, grime and the like, the nature of the usage renders it impractical or at best quite inconvenient to remove the cable for cleaning and relubricating. As known, typical examples of said usages include cabling in marine use, bridge suspension cables, elevator suspension cables, well drilling and well operating suspension cables, and the like.

In order to provide a lightweight, portable, universally adaptable and essentially simple yet efficient mechanism for cable cleaning and/or cable relubrication, the present invention provides a cable reconditioning device wherein the housing thereof is segmented in a manner providing a major section encompassing most of the circumference of a cable, and a relatively removable section of minor dimension, which segmenting of the mechanism housing permits the spring-loaded mounting of three brush assemblies about the cable, two such assemblies being in the major or main housing section or segment and the third such brush assembly being in the removable housing section or segment of minor dimension. An important and related feature and advantage of the present invention resides in its utilization in a cable cleaning and lubricating device of a nest of brush assemblies arrangeable circumferentially around a cable receiving opening, each of such brush assemblies comprising a shaft extending substantially parallel to the longitudinal axis of the cable receiving opening, with the said shafts being mounted in journaling means spring loaded to be urged radially inwardly toward the cable receiving opening, one of such brush assemblies being mounted in the removable minor segment of the mechanism housing, and the others of such nest of brush assemblies being mounted in the major segment of said housing. As a still further related object and advantage of the present invention, the arrangement of individual brush units in each such brush assembly comprises a plurality of non-powered, freely and independently rotatable brush units in stacked arrangement on the associated spring loaded shaft whereby the collection of brush assemblies around the cable receiving opening of the device is self-adaptable to various cable diameters and self-adaptable to incident irregularities in cable cross-sectional configuration, and whereby each such brush unit of a brush assembly is rotated by the wind of the cable strands without its relative rotation being impeded or accelerated by relative skipping or binding of adjacent brush units.

Yet other objects, features and advantages of the present invention include the provision in conjunction with cable cleaning brush assemblies of a self-contained reservoir or tank of lubricant selectively deliverable in a controlled extent to points of discharge proximately onto at least some of the brush assemblies, whereby a simultaneous cable cleaning and cable lubricating function is performed as the mechanism is moved along a cable. As a more detailed feature of the present invention, such tank is provided in the generally central portion of the major housing segment with the nests of brush assemblies arranged compactly contiguously thereof, to provide an overall mechanism configuration which is essentially generally cylindrical. Yet a further object and feature of the present invention is found in its constructural arrangement wherein the entire unit is readily fabricated and readily assemblable about or disassemblable from a cable simply by engagement or disengagement of strap means, and the associated pressurization supply for the lubricant tank is similarly readily engageable on or removable from the unit.

These and other objects, features, advantages and characteristics of the mechanisms and elemental arrangements involved in the present invention will be apparent to those skilled in the art to which applicant's invention is addressed, in view of the following more specific description of certain typical and therefore non-limitive embodiments thereof, taken together with the accompanying drawings, wherein like numerals refer to like parts, and wherein:

FIG. 1 is an isometric view of a form of the invention, showing the removable minor segment in detached relation to the major segment of the housing;

FIG. 2 is a view in elevation of the mechanism shown at FIG. 1, from an aspect showing the lubricant manifolding and valving, and the pressurization supply components;

FIG. 3 is a lateral cross section of the mechanism shown in FIGS. 1 and 2, taken substantially along line 3—3 of FIG. 2;

FIG. 4 is a fragmentary view in longitudinal cross section and on an enlarged scale showing assembly detail as to one of the brush assemblies, and particularly the freely rotatable brush units and spring loading of the brush assemblies characterizing the equipment;

FIG. 5 is a fragmentary isometric view of certain modified arrangements of the unit, including segmented cable guide means and open casing construction in the brush assembly housing end portions of the unit;

FIG. 6 is a fragmentary view on an enlarged scale of a modified form of lubricant manifolding and valving; and FIG. 7 is a lateral cross sectional view of a modified form of the equipment, similar to the view of FIG. 3 but showing in conjunction with the manifolding and valving of FIG. 6 a modified arrangement of lubricant delivery nozzle means.

Turning to a specific consideration of the form of the invention illustrated at FIGS. 1–4, the unit will be seen to have a housing of generally cylindrical configuration, comprising what may be termed a main body or major housing section 10, occupying a circumferential arc, or sector, laterally considered, of about 300° about a cable receiving opening 12 (FIG. 4), which housing further comprises a relatively removable smaller section 14, occupying an arc, or sector, circumferentially considered, of about 60° about said cable receiving opening 12.

Said major housing section 10 and the removable housing section 14 when assembled together by strapping clamps 16, 18 and 20, 22, collectively provide in each end portion 24 and 26 of the housing a casement for respective nests of brush assemblies 28, 30, 32 and 34, 36, 38.

The central portion of the mechanism may be generally termed a reservoir or tank section 40, the structural detail of which includes the central portion of an outer wall or casing 42 in the configuration of a sector of a cylinder and longitudinally spanning the end sections 24 and 26 as well as the said central tank portion 40. Structural detail of the tank section 40 further includes an interior panel 44 (FIG. 1) joining the central edge portions of said casing 42, the tank chamber of said tank section 40 being completed by laterally extending walls 46 and 48 joined to said casing 42 and panel 44.

Said central portion 40 of the housing mounts by means of straps 50 and 52 and cradles 54 and 56 a supply of pressurized fluid, such as a $CO_2$ cylinder 58, the outlet valve 60 of which feeds gaged regulator valve 62 which in turn communicates through flexible pressure line 64 with inlet 66 of the tank chamber. In the form of the invention shown in FIGS. 1–4, the tank chamber is also provided with a threaded fill plug 67 independent of the pressurization line 64 and inlet 66. Outfeed from the tank chamber, in this form of the invention, is from outlet fitting 68 (FIGS. 2 and 3) through flexible line 70, manually regulatable flow control valve 72, and elbow 74 into manifold 76, from whence the lubricant is distributed through lines 78, 80, 82 and 84 to discharge nozzles 86, 88, 90 and 92 directed through casing 42 to be substantially radially of the cable receiving opening 12 and proximately above the respective nests of brush assemblies 28, 30 and 32, and 34, 36 and 38 (FIGS. 2 and 3). Illustrative spray patterns of lubricant from nozzles 86 and 88 are shown in FIG. 3 at 86' and 88', for example.

The tank chamber is filled with any desired lubricant or cleaner-lubricant, such as Lubriplate 130–AAA marketed by Fiske Bros. Refining Co., Newark, N.J.

End section 24 comprises longitudinally spaced, laterally extending wall members 100 and 102 of main body 10 along with respective matching wall segments 104 and 106 forming a part of removable housing section 14. Said wall members 100 and 102 are suitably removably attached to casing 42 of main body 10, as by means of screws, certain of which are indicated at 108, and wall segments 104 and 106 are similarly mounted on the casing portion 110 of removable housing section 14, as by screws, certain of which are indicated at 112. The assembly of the wall segments 104 and 106 in lateral alignment with walls 100 and 102 when housing section 14 is strapped to housing section 10 is suitably maintained, as by pins 114 on wall 100 engaging corresponding recesses in wall 104, one of which is shown at 116.

The constructional detail of end section 26 is reversely identical to that of the end section 24, involving wall members 120 and 122 in main housing section 10, and wall segments 124 and 126 in removable housing section 14, said walls 120 and 122 being removably positioned in casing 42 as by screws 128, and said walls 124 and 126 being mounted on the lower portion of casing 110 as by screws 130, and the relative alignment of walls 120, 124 and walls 122, 126 being maintained by pins on wall 120, one of which is shown at 132, and recesses on wall 124, one of which is shown at 134.

As shown in FIGS. 2 and 3, the end portions of casing 42 also mount a plurality of hauling loops or eyes 136, 138, 140 and 142, to which can be tied one or more hauling lanyards L by means of which the unit can be moved along the cable C being cleaned and lubricated.

As earlier indicated, operationally important features of the cable cleaning action afforded by the mechanism of the present invention are found in the provision of spring loading for each of the nested brush assemblies, and in the provision that each of the brush assemblies is made up of a multiplicity of independently rotatable brush units which can individually follow the wind of the cable and more effectively clean between the cable strands. To more specifically illustrate this construction, FIG. 4 presents in fragmentary, cross sectional view one of such brush assemblies, brush assembly 30 being selected by way of example. As will be understood, the constructional arrangement of each of the brush assemblies 28, 30, 32, 34, 36 and 38 is identical to the other in these respects, and that illustration and discussion of one such arrangement will suffice to describe all. As shown in FIG. 4, brush assembly 30 comprises a series of stacked, non-powered, freely and independently rotatable brush units 30a through 30j, ten such brush units being indicated by way of example. Said brush units 30a—30j are journaled on a common shaft 150 with a series of spacer rings 152 between brush units and with threaded retainer nuts 154 and washers 156 completing the shaft assembly so that such is readily disassemblable.

The ends of shaft 150 are in turn suitably journaled or otherwise held in floating journal plugs 158 and 160, which can advantageously be fabricated from nylon, for example. Plugs 158, 160 are urged radially toward the cable C in cable receiving opening 12 by compression springs 162 and 164, each acting against respective seat plates 166, 168, serving as interchangeable spring spacers to vary the extent of spring compression, as desired. As earlier discussed in connection with FIGS. 1 and 2, walls 100 and 102 are mounted on casing 142 as by screws 108. Each journaling assembly for the ends of shaft 150 is completed by a respective removable retainer plate 170, 172 attached to walls 100, 102 as by screws 174, 176.

In certain applications of the cable cleaning and lubricating unit it may prove advisable to provide for more positive cable guiding than is inherently available from the spring-like centering action of the nests of brush assemblies 28, 30, 32 and 32, 34, 36 themselves. To show a suitable way this can be accomplished, and to also show a modified form of brush section casing construction, FIG. 5 in fragmentary isometric view presents the upper end portion of a modified end section 24', wherein in association with wall member 100 a split ring cable guide comprising inserts 180 and 182 are of a configuration to be held together by the assembled wall members 100 and 104 (cf. FIG. 1), providing at the point of end contact of the unit with a cable a rigid guiding bore 184 selected to be only slightly larger than the cable diameter. As will be apparent, such guiding inserts 180, 182 can be used at both ends of the unit, and can be available in sets to adapt the unit to whatever size of cable is presented. In conjunction with such cable guide inserts, or independently thereof, the portion of the unit casing surrounding a nest of brush assemblies can be of open construction, as by being fabricated from expanded metal such as shown at 42' in FIG. 5, in order to facilitate egress of accumulated material cleaned from the cable by the brush assemblies.

FIGS. 6 and 7 serve to illustrate by fragmentary views a modified form of lubricant manifolding and valving adapted for remote control of lubricant flow, and adapted to present a lubricant supply nozzle to each of the brush assemblies. In this modification, the pressurization of the lubricant tank chamber is from $CO_2$ cylinder 58, valve 60, regulator 62, manual cut-off valve 188, line 64 and inlet fitting 66, the latter being detachable for filling. Outlet 190 leads from the pressurized lubricant tank to a manifold 192 in which is mounted manual flow control valve 194, shown in the open position in FIG. 7 and shown in the closed position in FIG. 6. Said valve 194 is normally urged to a closed position by a leaf spring 196 and when set to an open position is manually lifted outwardly until key 198 can be moved into locking engagement with recess cut 200 (FIG. 6) on the stem of valve 194. With valve 194 thus locked open, the cleaning then can proceed with lubricant supply until such a time as it is desired that the lubricant flow be cut off, at which time such control can be effected regardless of the position of the unit on the cable remotely from the operator, simply by the operator pulling on valve line VL, as indicated at 202, to dislodge key 198, whereupon spring 196 closes the valve. Guard element 204 serves to limit the extent of withdrawal of valve 194 and to protect it from such damage as might be caused by impact of the equipment against surrounding structure.

Manifold 192 feeds lubricant supply lines 206, 208, 210, 212, 214 and 216 which respectively terminate in nozzles directed toward brush assemblies 32, 30, 28, 38, 34 and 36, three such nozzles as associated with brush assemblies 32, 30 and 28 being shown at FIG. 7 at 220, 222 and 224, the casing 42" of the main housing section and the casing 110' of the removable housing section being suitably cut away to provide nozzle access, as shown at FIG. 7. As also shown at FIG. 7, the longer lubricant feed lines 206 and 212 are preferably removably strapped to the casing 42', (as by clamps such as clamp 226 shown on line 206), in order to more firmly support the lines and in order to permit their being readily removable in conjunction with removal of the removable housing section.

From the foregoing, various further modifications and adaptations employing some or all of the features of the invention will be apparent to those skilled in the art. Thus, for example, the housing sector occupied by the removable housing section 14 can be varied considerably in circumferential extent, so long as the desired brush assembly arrangement is established and so long as cable-width access to the cable-receiving opening is maintained. Similarly, as will be evident, a given equipment could involve but a single nest of brush assemblies at one end and a tank section at the other, or more than two nests of brush assemblies, keeping in mind that the number of nests of brush assemblies determines to some extent the number of passes back and forth of the unit on the cable. Also, one nest of brush assemblies which is power driven can be added to the unit as an attachment, or be substituted for one of the non-power-driven nests of assemblies, it being considered desirable in some instances when encountering particularly grimy cable to give a first "rough clean" by power-driven brushes. In a power-driven attachment, of course, single brush units or driven shafts would be employed, and the driving of the shafts could be by suitable linkage such as flexible shaftings to a common source of rotational torque, such as an air motor. Also, in any of the brush assemblies, it will be understood that the shaft can be offset somewhat with respect to the axis of the cable receiving opening.

While one major advantage of the multiplicity of independently rotatable, non-power-driven brush assemblies lies in the greater efficiency thereof for cleaning lines of irregular surface contour, such as wound or woven lines, it will also be apparent that such capability and effectiveness does not impair the utilization of the brushing assemblies for cleaning smooth-surfaced pipe, tubing or the like.

Accordingly, these as well as such other modifications, adaptations and modes of utilization as may evolve which characterize the invention are to be considered within the scope of the invention as defined by the following claims.

What is claimed is:

1. A cable reconditioning device comprising a generally cylindrical body having brush carrying end portions and a central tank portion, said body having a lengthwise extending sector removable from the other portion of said body and occupying a minor portion of the circumferential extent of said body, each said brush carrying end portion mounting a plurality of spring loaded shafts arranged in a spaced pattern around the axial center of said body, a plurality of freely rotatable brushes arranged coaxially on said shafts, each of a radial dimension to be in yieldable pressure engagement with a cable placed at the axial center of said body, means pressurizing said tank portion, and means selectively delivering lubricant under pressure in said tank section to points of discharge proximately of at least a part of said brushes.

2. In a cable cleaning and lubricating device, brush assembly containing end sections and a tank included central section, each with respectively unitarily assembled housing portions, the said brush assemblies including respectively substantially parallel shafts each having journaled thereon a plurality of wire brush units, said housing comprising two laterally extending walls intermediate the ends of the housing and two intermediate end walls, each such brush assembly shaft being spring loaded inwardly and radially toward the center of said housing by shaft end receiving journal plugs contacting but relatively movable with respect to said end walls within keeper channels extending radially of said end walls, each of such journal plugs being urged radially of the cable by compression spring means retained in said keeper channels.

3. A lubricating and cleaning device according to claim 2, wherein said intermediate walls comprise part of said tank, the said tank having an input connected to a source of pressurized gas and an output communicating with lubricant delivering means in turn discharging proximately of said brush assemblies.

4. A cable reconditioning device comprising a generally cylindrical body having brush carrying end portions and a central tank portion, said body having a lengthwise extending sector removable from the other portion of said body so as to permit installation of said body to a cable directly at any selected point along the cable, each said brush carrying end portion mounting a plurality of spring loaded shafts arranged substantially parallel to and in a spaced pattern around the axial center of said body, a plurality of brushes journaled to freely rotate on said shafts, each of said brushes being of a radial dimension to be in yieldable pressure engagement with the cable placed at the axial center of said body, means pressurizing said tank portion, and means selectively delivering lubricant under pressure in said tank section to points of discharge proximately of at least a part of said brushes.

5. In a cable cleaning mechanism, a non-powered nest of spring-loaded brush assemblies, each assembly comprising a plurality of individually rotatable brush units rotated by the bristles thereof following the wind of the cable as the device is moved relatively along the cable, each of said brush units being oriented to rotate about an axis substantially parallel to the cable.

6. A cable cleaning mechanism comprising a housing having a major sector and a removable minor sector together forming a cable receiving opening, such major sector having a plurality of spring-loaded brush assemblies in one portion thereof, and such minor sector having a brush assembly at one portion thereof, each of said brush assemblies comprising a plurality of individually rotatable brush units, means journaling said brush units to rotate about an axis substantially parallel to the length of the cable, and means resiliently urging the brush unit journaling means toward the cable to place the brush units in contact with the cable.

7. A cable cleaning mechanism comprising a nest of three brush assemblies spaced about a central axis, each such assembly comprising non-powered, individually rotatable brush units, means journaling said brush units for rotation about an axis substantially parallel to said central axis, and spring means loading said brush units towards said central axis.

8. Mechanism according to claim 7 further comprising a generally cylindrical housing having a major sector and removable minor sector together forming a cable receiving opening concentric with the central axis, such major sector mounting two of such brush assemblies and such minor sector mounting the third brush assembly.

9. In a cable cleaning device, a nest of brush assemblies arranged circumferentially around a longitudinal center axis, each said brush assembly comprising brush means individually and freely rotatable on a shaft extending substantially parallel to said longitudinal center axis, the said shaft being mounted in journaling means spring loaded to be urged radially inwardly toward said center axis, and the said brush means being rotatable by the weave of the cable as the cleaning device is moved relative to the cable.

10. A cable cleaning and lubricating device according to claim 9, wherein said nest of brush assemblies comprises three such assemblies arranged at substantially equal spacings circumferentially around the center axis, and one such brush assembly is mounted on a casing portion so as to be relatively removable from the other two such brush assemblies in order to permit ready installation and removal of the device on and from a cable.

11. A cable cleaning and lubricating mechanism comprising elongated matching casing sections, one of which longitudinally encompasses a major segment of the circumference of a cable along a length thereof, and the other of which is removable from the sector of major dimension in order to facilitate installation of the device on a cable, spring loaded brush assemblies at the ends of both said casings with the brush means thereof individually rotatable about axes disposed substantially longitudinally of said casing sections, a lubricant tank in the intermediate portion of the major casing section, and means for delivering lubricant from said tank to said cable substantially at points thereof contacted by at least some of said brush means.

12. A cable cleaning and lubricating mechanism comprising elongated matching casing sections, one of which longitudinally encompasses a major segment of the circumference of a cable along a length thereof, and the other of which is removable from the section of major dimension in order to facilitate installation of the device on the cable, spring loaded brush assemblies at the ends of both said casings with the brush means thereof rotatable about axes disposed substantially longitudinally of said casing sections, a lubricant tank in the intermediate portion of the major casing section, means for delivering lubricant from said tank to said cable substantially at points thereof contacted by at least some of said brush means, and said marjor casing section mounting a tank of pressurized gas in communication with said lubricant tank through manually controllable valve means.

13. A mechanism according to claim 11, wherein said means for delivering lubricant from said tank to said cable includes an output manifold fed by said tank and a plurality of nozzle terminated lubricant lines extending from said manifold to points in the proximity of at least some of said brush assemblies.

14. A mechanism according to claim 11, wherein outer walls of the casing section portions surrounding the spring loaded brush assemblies are of perforate form.

15. A cable reconditioning assembly comprising separate housing sections together forming a cable receiving opening having a longitudinally extending center axis, each such housing section mounting brush assemblies spring loaded radially toward said center axis, each assembly comprising a plurality of individually rotatable brush units, with each of said brush units being oriented to rotate about an axis substantially parallel to the cable and with each housing section having end closure forming wall members serving as part of the mounting support means for the brush assemblies.

16. An assembly according to claim 15, further comprising separable, split form cable guide means retained concentrically of said cable receiving opening by engagement with the said end wall closure forming end members.

17. In a cable cleaning and lubricating device; two separable, matching housing sections, each in the external configuration substantially of a segment of a cylinder, one such housing section occupying a circumferential arc, laterally considered, of about 300°, forming a portion of a cable receiving opening, and the other such section occupying an arc, circumferentially considered, of about 60°, forming the remainder of the cable receiving opening, such larger housing section having mounted at the ends thereof a plurality of spring-loaded brush assemblies, and such smaller housing section mounting at each end thereof a spring-loaded brush assembly, means urging said brush assemblies radially toward said cable receiving opening, and each of said spring-loaded brush assemblies comprising individually and freely rotatable brush means.

18. In combination with a cable, a cable cleaning mechanism adapted to be moved along said cable, such mechanism including a nest of spring-loaded assemblies, each such assembly comprising a plurality of freely and independently rotatable brush units rotated by the bristles thereof following the wind of the cable as the mechanism is moved relatively along the cable, each of said brush units being oriented to rotate about an axis substantially parallel to the cable, such combination further comprising means for moving said mechanism relatively along said cable.

19. In a cable cleaning device, a nest of brush assemblies arranged circumferentially around a longitudinal center axis, each such brush assembly comprising a plurality of independently and freely rotatable brush units in stacked arrangement on a shaft extending substantially parallel to said longitudinal center axis, the said shaft being mounted in journaling means spring loaded to be urged radially inwardly toward said center axis, and the said brush units being rotatable by the weave of the cable as the cleaning device is moved relative to the cable.

20. A cable reconditioning assembly comprising separate housing sections together forming a cable receiving opening having a longitudinally extending central axis, each such housing section mounting brush assemblies spring loaded radially toward said central axis, with the brushes thereof rotatable about axes substantially parallel to the central axis, with each housing section having end closure forming wall members serving as part of a mounting support means for the brush assemblies, and lubricant supply means including a pressurized lubricant supply tank in one of said housing sections, means pressurizing said tank, and means communicating said tank with conduit means for delivering lubricant to at least some of said brush assemblies.

References Cited in the file of this patent

UNITED STATES PATENTS

| | | |
|---|---|---|
| 439,916 | Whittlesey | Nov. 4, 1890 |
| 733,255 | McGill | July 7, 1903 |
| 1,294,200 | Tritton | Feb. 11, 1919 |
| 1,509,906 | Sawtelle | Sept. 30, 1924 |
| 2,703,423 | Hunt | Mar. 8, 1955 |
| 2,821,730 | Shellman | Feb. 4, 1958 |

FOREIGN PATENTS

| | | |
|---|---|---|
| 97,495 | Germany | June 17, 1898 |
| 16,090 | Great Britain | of 1906 |
| 40,301 | Austria | Dec. 27, 1909 |
| 314,324 | Italy | Jan. 23, 1934 |
| 722,833 | France | Aug. 30, 1934 |
| 126,322 | Sweden | Oct. 4, 1949 |